Oct. 29, 1929.  A. RASMUSSEN ET AL  1,733,627
BARBECUE MACHINE
Filed Feb. 20, 1928    2 Sheets-Sheet 2
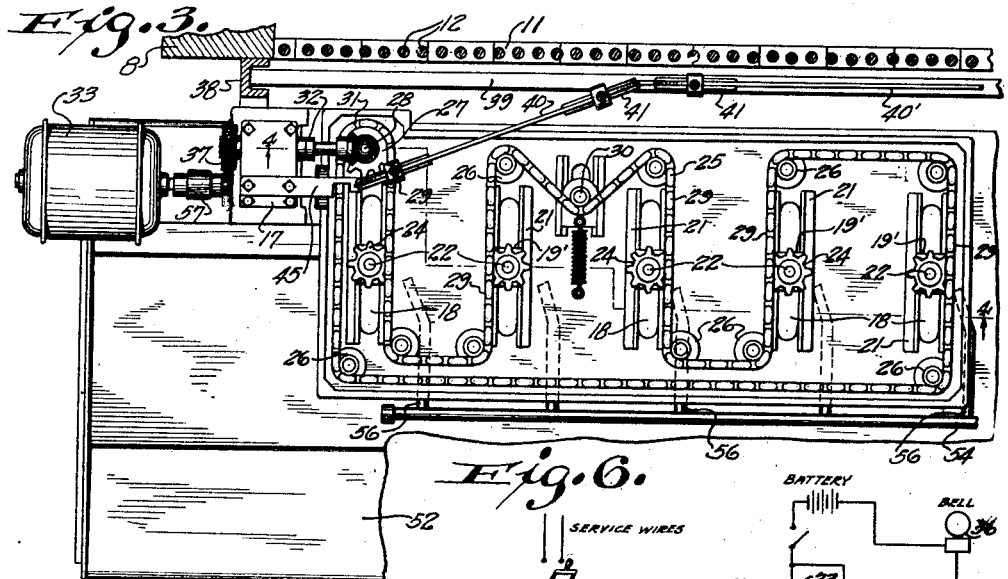
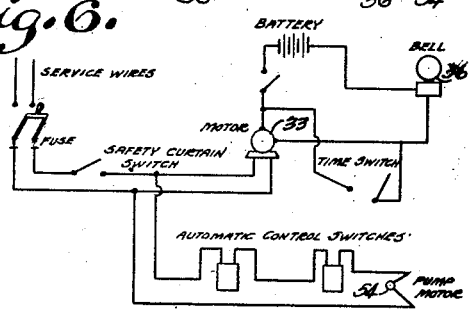
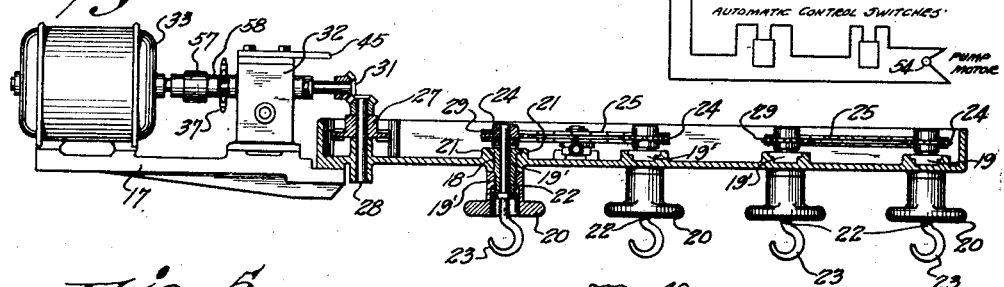
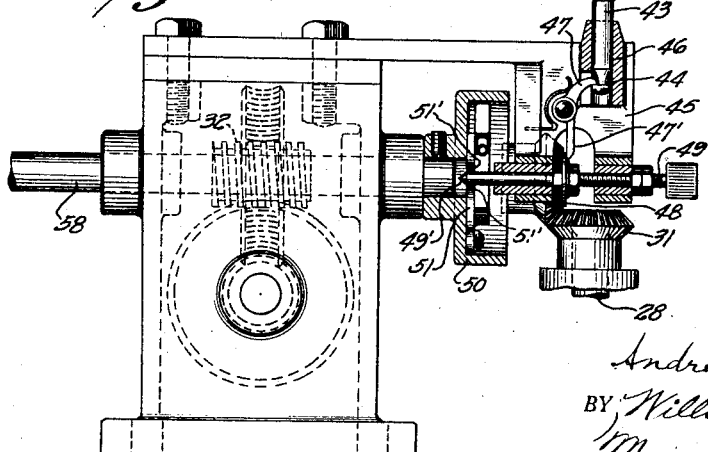
INVENTORS
Andrew Rasmussen
William S. Goodell
BY
Morsell, Keeney, Morsell
ATTORNEYS Patented Oct. 29, 1929

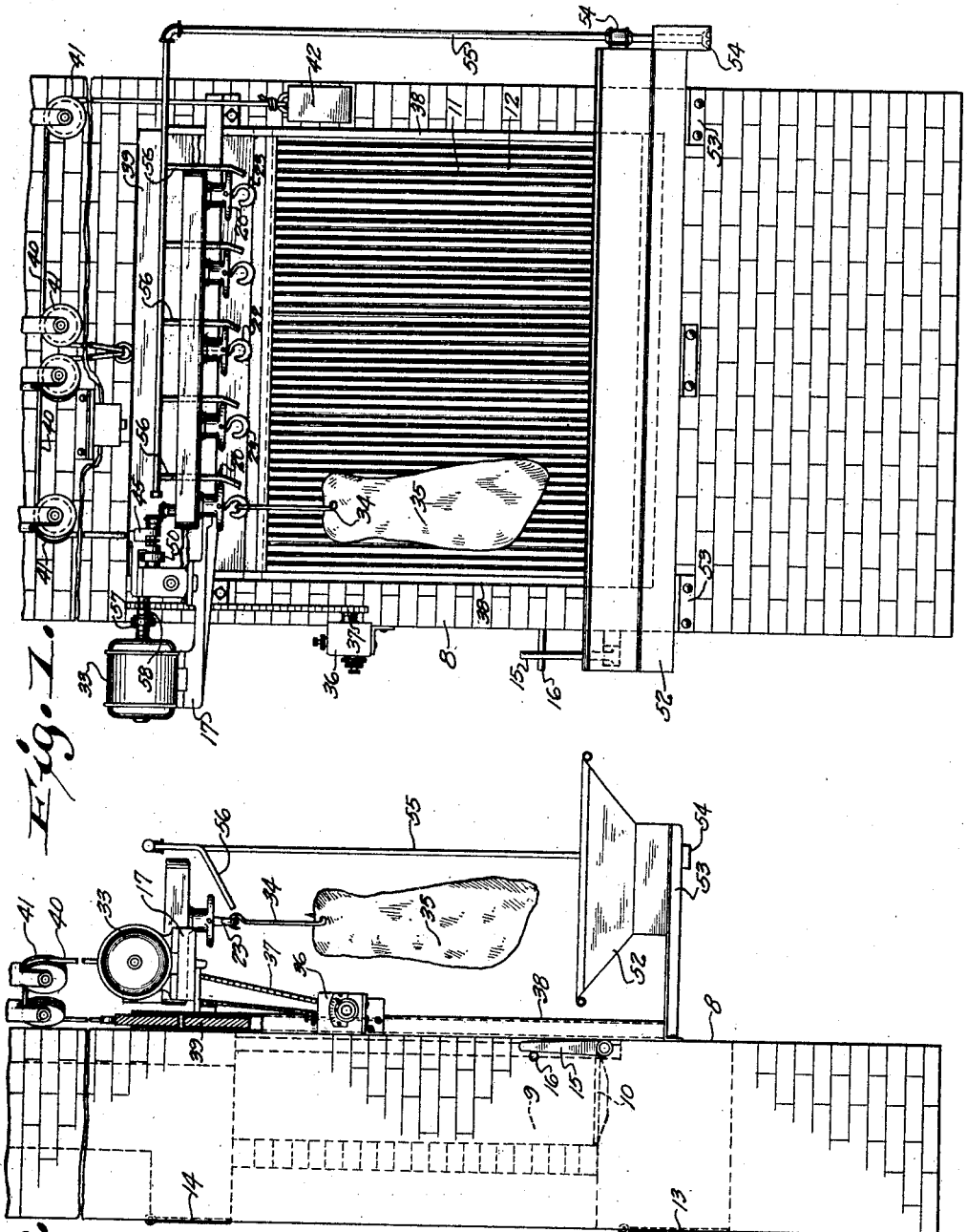

1,733,627

UNITED STATES PATENT OFFICE

ANDREW RASMUSSEN AND WILLIAM S. GOODELL, OF RACINE, WISCONSIN

BARBECUE MACHINE

Application filed February 20, 1928. Serial No. 255,665.

This invention relates to improvements in barbecue machines.

It is one of the objects of the present invention to provide a barbecue machine for roasting or broiling a plurality of pieces of meat or other material at the same time before an open fire in which the cooking period is controlled automatically to prevent burning or over-cooking.

A further object of the invention is to provide a barbecue machine having automatic means for individually rotating each piece of meat during the cooking operation to present all sides of each piece to the heat of the fire.

A further object of the invention is to provide a barbecue machine which will permit the independent adjustment of any of the meat-carrying rotary members towards or away from the fire or other cooking medium without stopping or otherwise interfering with the operation of the machine.

A further object of the invention is to provide a barbecue machine having means for automatically sounding an alarm and lowering a curtain upon stopping or slipping of driving belts or failure of current to the electric motor rotating the meat-carrying rotary members to prevent burning the meat.

A further object of the invention is to provide a barbecue machine having means for automatically basting the pieces of meat being roasted for certain predetermined periods after the pieces of meat have been subjected to heat of the fire for a certain period.

A further object of the invention is to provide a barbecue machine which is of simple construction, is strong and durable, and is well adapted for the purpose described.

With the above and other objects in view the invention consists of the improved barbecue machine and its parts and combinations as set forth in the claims, and all equivalents thereof.

In the accompanying drawings in which the same reference characters indicate the same parts in all of the views:

Fig. 1 is a front view of the improved barbecue machine, with a piece of meat shown suspended from one of the holding members;

Fig. 2 is a side view thereof, parts being shown in section;

Fig. 3 is a top view on a larger scale of the barbecue machine, a part being shown in section;

Fig. 4 is a vertical longitudinal sectional view of the upper portion of the barbecue machine;

Fig. 5 is a side view of the curtain releasing mechanism, parts being shown in section; and Fig. 6 is a diagrammatic view of the electrical connections.

Referring to the drawings, the numeral 8 indicates a wall oven which is provided with a fire box 9, a tiltable grate 10, a side opening 11 covered with grating bars 12, and clean-out doors 13 and firing doors 14. The side opening 11 protected by the grate bars 12 forms the heating means for roasting or broiling the meats or other materials hung in front of said opening. The grate 10 is of the tiltable type and is provided with a handle 15 for tilting the grate and for holding the grate in horizontal position, while a pin 16 holds the handle in upright position.

A horizontal frame 17 mounted on the upper front wall portion of the oven is provided with transverse openings 18 for adjustably receiving bearing members 19. Hand nuts 20 threaded on the lower end portions of the bearing members adjustably clamp the bearings in position in the transverse openings or slots. The upper end portions of the bearings have squared heads 19' which fit between transverse ribs 21 to hold and prevent the bearings from turning. Short shafts 22 having lower hooked ends 23 extend through the bearings and at their upper ends have sprocket wheels 24 mounted fast thereon, which are engaged by an endless sprocket chain 25. The chain also extends around idler pulleys or wheels 26 and a driving sprocket wheel 27 mounted on a short vertical shaft 28. The idler pulleys have lower flanges to support the sprocket chain and are positioned in pairs in alinement with one of the transverse ribs 21 of each pair of ribs to provide a straight transverse chain section 29 for each sprocket wheel 24, to permit the engagement of the sprocket wheels 24 with the said straight sections in any position of adjustment of said sprocket wheels. A spring controlled chain tightener 30 is provided for yieldingly taking up slack in the chain.

The short vertical shaft 28 has a bevel gear connection 31 with a gear reduction mechanism 32 of the worm and worm wheel type, and the reduction mechanism is connected to and driven by an electric motor 33. The motor will rotate the chain and cause the rotation of the sprocket wheels and short shafts 22 and hook members 34, from which pieces of meat 35 are suspended and slowly rotated thereby in front of the grate bars. An automatic control and time switch 36 is driven from the gear reduction shaft 32' by a sprocket chain and wheel connection 37 to provide for the cooking and basting periods.

The front portion of the wall on opposite sides of the grate is provided with channel bars 38 to receive a fireproof curtain 39 which is arranged to drop downwardly in front of the grate bars 12 when desired to insulate the pieces of meat from the fire. The curtain is suspended from cables 40 and 40', which extend over pulleys 41, and one of the cables 40' is provided with a counterweight 42 which does not quite counterbalance the weight of the curtain, so that when the curtain is released it will drop between the meat and the fire. The controlling cable 40 extends over some of the pulleys 41, and at its opposite end is connected to a pin 43 having an annular shoulder 44 formed at its lower end. A controlling mechanism 45 mounted on the gear transmission is provided with a socket 46 for receiving the pin 43, and into which socket extends a bell crank lever 47 which engages the shoulder 44 of the pin to hold the curtain in its upper position. The opposite end 47' of the bell crank lever bears against the outer face of a disk 48 mounted on a rod 49, and the inner end of said rod is formed with a conical end 49' which extends into the bore of a governor member 50. Said member carries centrifugally actuated weighted arms 51 having beveled inner edges 51' which are adapted to engage the conical end 49' of the rod 49 and force said rod outwardly when the speed of rotation of the transmission shaft, upon which the member 50 is mounted, decreases to a predetermined extent or stops. This movement will release the pin 43 and drop the curtain 39 to protect the meat.

In broiling or roasting meat, it is very desirable to baste the meat at and for predetermined periods of time after the meat has been initially subjected to the heat for a certain period. To accomplish this result, a tank 52 positioned beneath the hook members 34 is supported upon arms 53 projecting outwardly from the wall of the oven to receive the drippings from the pieces of meat suspended from the hook members 34. An electrically actuated pump 54 having its inlet opening connected to the bottom portion of the tank at one end has an outlet pipe 55 which extends upwardly to the frame 17 and horizontally along the front portion of the frame 17. Branch pipes 56 connected to the pipe 55, and extending, respectively, downwardly and inwardly, terminate adjacent the meat hook members 34 to direct the basting fluid and meat drippings from the tank, upon each piece of meat suspended from the hooks.

A friction clutch 57 mounted on the gear reduction shaft 58 provides for drivingly disengaging the motor from the gear reduction.

Fig. 6 shows a diagrammatic view of the electrical connections and switches which are in part included in the time switch 36 and are self-explanatory.

In use, pieces of meat are connected to the hook members 34, and said hook members are connected to the lower hooked ends 23 of the short shafts; and the current to the motor is then turned on to rotate the short shafts and the pieces of meat suspended therefrom. The meat in turning will be subjected to the heat from the open fire, and will be broiled or roasted, and the juices therefrom will drop into the tank 52. Before starting the cooking, the regulator 36 is set to automatically turn on current to the basting pump after the meat has been subjected to the cooking operation for a predetermined period of time, and initially baste the meat. After the initial basting the regulator will turn on the current to the pump to intermittently baste the meat at stated periods of time. If for any reason the motor turning the pieces of meat should slow up in speed or stop, the pin 43 holding up the fireproof curtain would be released and drop the curtain in front of the fire and thus protect the meat from burning. The machine also provides for ringing a bell 36' when stopping. As the short shaft bearings are adjustable transversely of the supporting frame, each piece of meat may be turned in a plane closer to or farther from the fire grate, thus providing for cooking various sizes or kinds of meat.

From the foregoing description, it will be seen that the barbecue machine is well adapted for the purpose described.

What we claim as our invention is:

1. A barbecue machine, comprising a heating member having an open side portion, a frame positioned adjacent thereto and having a plurality of elongated slots extending towards the open side portion of the heating member, bearing members adjustably mounted in parallel relation in said slots, shafts journaled in the bearings and having means for suspending pieces of food material therefrom and in front of the open side portion of the heating member, means for rotating the shafts and permitting adjustment of and clamping of the bearings in the elongated slots, and means controlling the rotation of the rotary members.

2. A barbecue machine, comprising a heating member having an open side portion, a frame positioned adjacent thereto and having a plurality of elongated slots extending towards the open side portion of the heating member, bearing members adjustably mounted in the slots, shafts journaled in the bearings and having means at their lower ends for suspending pieces of food material therefrom and in front of the open side portion of the heating member, sprocket wheels mounted on the upper end portions of the shafts, a sprocket chain adjustably engaged by the sprocket wheels and extending in a plurality of planes parallel to the elongated slots, and means for rotating the sprocket chain.

3. A barbecue machine, comprising a heating member having an open side portion, a frame positioned adjacent thereto and having a plurality of elongated slots extending towards the open side portion of the heating member, bearing members mounted in the slotted portions and adjustable towards and away from the open side portion of the heating member, means for securing the bearing members in adjusted position, shafts journaled in the bearings and having lower hook portions for suspending pieces of food material therefrom and in front of the open side portion of the heating member, sprocket wheels mounted on the upper end portions of the shafts, idler chain wheels journaled on the frame and positioned adjacent opposite end portions of the elongated slots, a driving sprocket wheel journaled on the frame, a sprocket chain extending around the idler wheels and the driving sprocket to provide straight sections of the chain extending parallel to the elongated slots, said straight sections being drivingly engaged by the sprocket wheels of the shafts, and means for rotating the driving sprocket wheel.

4. A barbecue machine, comprising a heating member having an open side portion, a frame positioned adjacent thereto and having a plurality of elongated slots extending towards the open side portion of the heating member, bearing members mounted in the slotted portions and adjustable towards and away from the open side portion of the heating member, means for securing the bearing members in adjusted position, shafts journaled in the bearings and having lower hook portions for suspending pieces of food material therefrom and in front of the open side portion of the heating member, sprocket wheels mounted on the upper end portions of the shafts, idler chain wheels journaled on the frame and positioned adjacent opposite end portions of the elongated slots, a driving sprocket wheel journaled on the frame, a sprocket chain extending around the idler wheels and the driving sprocket to provide straight sections of the chain extending parallel to the elongated slots, said straight sections being drivingly engaged by the sprocket wheels of the shafts, a reduction gear mounted on the frame and having a geared connection with the drive sprocket wheel, and a motor for driving the reduction gear.

5. A barbecue machine, comprising a heating member having an open side portion, a frame positioned adjacent thereto and having a plurality of elongated slots extending towards the open side portion of the heating member, bearing members mounted in the slotted portions and adjustable towards and away from the open side portion of the heating member, means for securing the bearing members in adjusted position, shafts journaled in the bearings and having lower hook portions for suspending pieces of food material therefrom and in front of the open side portion of the heating member, sprocket wheels mounted on the upper end portions of the shafts, idler chain wheels journaled on the frame and positioned adjacent opposite end portions of the elongated slots, a driving sprocket wheel journaled on the frame, a sprocket chain extending around the idler wheels and the driving sprocket to provide straight sections of the chain extending parallel to the elongated slots, said straight sections being drivingly engaged by the sprocket wheels of the shafts, a reduction gear mounted on the frame and having a geared connection with the drive sprocket wheel, an electric motor for driving the reduction gear, a pump motor and means actuated from the reduction gear for controlling the electric current to the pump motor.

6. A barbecue machine, comprising a heating means, a frame positioned adjacent thereto, a plurality of rotary members carried by the frame and having means for suspending pieces of food material therefrom and in front of the heating means, means for rotating the rotary members, a heat proof screen movable to a position between the heating means and the food material, and means controlling the rotation of the rotary members and the interposition of the screen between the heating means and the pieces of food material.

7. A barbecue machine, comprising a heating member having an open side portion, a frame positioned adjacent thereto, a plurality of rotary members carried by the frame and having means for suspending pieces of food material therefrom in front of the open side portion of the heating means, means for rotating the rotary members, a heat proof screen movable to a position between the open side of the heating means and the suspended food material, a counterweight for the screen, and means controlling the rotation of the rotary members and the interposition of the screen between the heating means and the pieces of food material.

8. A barbecue machine, comprising a heating member, a frame positioned adjacent thereto, vertical shafts journaled in the frame and having lower hooked portions for suspending pieces of food material in front of the heating member, sprocket wheels mounted on the vertical shafts, idler wheels journaled on the frame, a driving sprocket wheel journaled on the frame, a sprocket chain engaging the sprocket wheels and the idler wheels, a motor for rotating the sprocket chain, a basting fluid holding tank positioned below the suspended pieces of food material for receiving the drippings therefrom, a conduit means for directing the basting fluid from the tank to the pieces of suspended food material, a pump means for forcing the basting liquid through said conduit means, a pump driving means, and means controlling the intermittent operation of the pump driving means.

9. A barbecue machine, comprising a heating member having an open side portion, a frame positioned adjacent thereto and having an elongated slot extending towards the open side portion of the heating member, a bearing member adjustably mounted in said slot, a shaft journaled in the bearing and having means for suspending pieces of food material therefrom and in front of the open side portion of the heating member, means for rotating the shaft and permitting adjustment of the bearing in the elongated slot, means for clamping the bearing to the frame in adjusted position, and means controlling the speed of rotation of the shaft.

In testimony whereof, we affix our signatures.

ANDREW RASMUSSEN.
WILLIAM S. GOODELL.